No. 666,591. Patented Jan. 22, 1901.
T. G. AMES.
ACETYLENE GAS GENERATOR.
(Application filed Sept. 2, 1899.)
(No Model.)
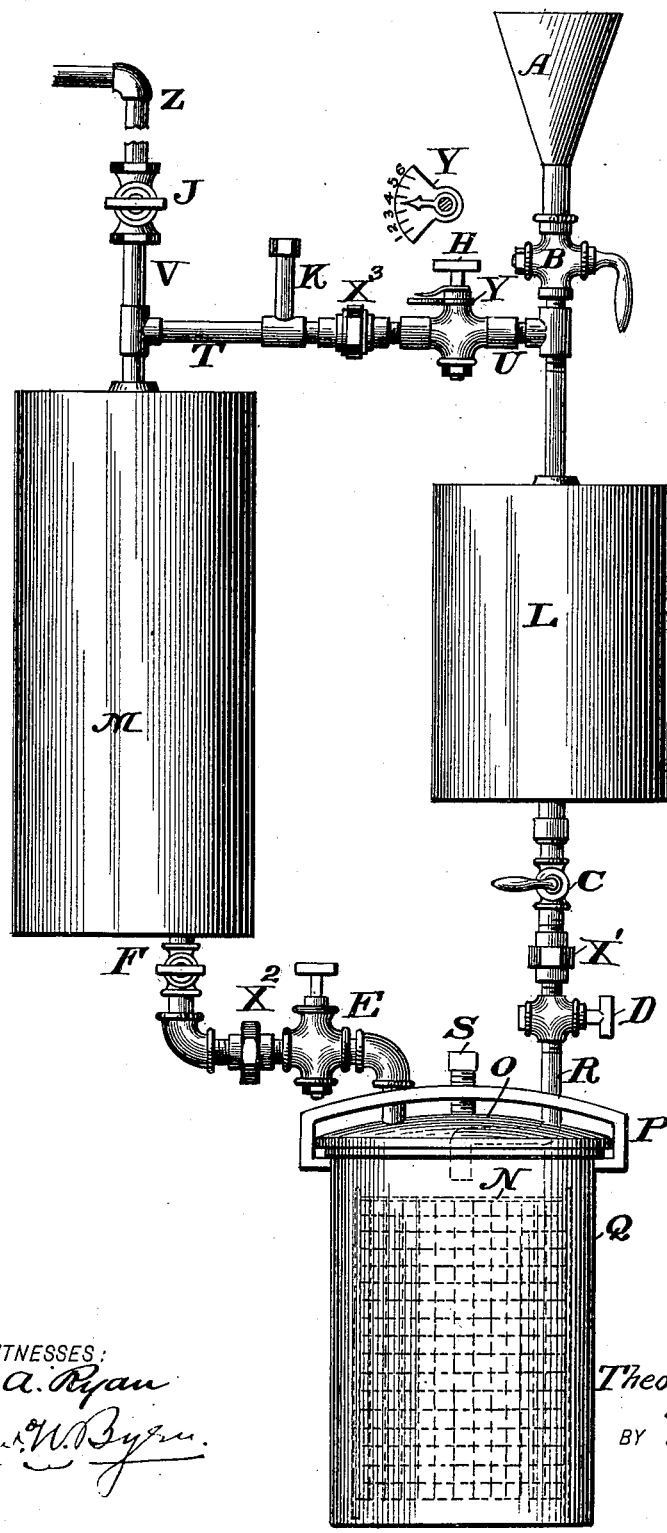
WITNESSES:
Jos. A. Ryan
Edw. W. Byrn.
INVENTOR
Theodore G. Ames
BY Munn & Co.
ATTORNEYS.

UNITED STATES PATENT OFFICE.

THEODORE GEORGE AMES, OF ALBUQUERQUE, TERRITORY OF NEW MEXICO.

ACETYLENE-GAS GENERATOR.

SPECIFICATION forming part of Letters Patent No. 666,591, dated January 22, 1901.

Application filed September 2, 1899. Serial No. 729,361. (No model.)

*To all whom it may concern:*

Be it known that I, THEODORE GEORGE AMES, of Albuquerque, in the county of Bernalillo and Territory of New Mexico, have invented a new and useful Improvement in Acetylene-Gas Machines, of which the following is a specification.

The object of my invention is to provide a simple and practical machine for generating acetylene gas, which may be cheaply and strongly constructed with couplings, holders, and fittings already on the market, and which when properly adjusted will act automatically until its charge of calcium carbid is exhausted.

It relates to that form of apparatus in which the water is delivered upon a charge of calcium carbid held in a basket; and it consists in the organization of the machine, as hereinafter more fully shown and described, reference being had to the accompanying drawing, in which the figure is a side elevation of the machine.

In the drawing, A is a funnel to receive water.

B is a stop-cock to shut off the supply of water.

L is the water-reservoir cylinder.

C is a shut-off cock between union-coupling X' and water-cylinder.

X' is a union connecting water-cylinder and generator.

D is a shut-off cock to prevent escape of gas when union X' is open.

R is a pipe from water-cylinder to the generator.

O is a lid to the generator, made of cast-iron, with cast opening for water-pipe R to pass through it and having a rubber gasket at its edges.

S is a screw tapped through clamp P and bearing on the lid.

P is a clamp with hooked ends engaging a lip or flange of the generator.

Q is the generator, with the calcium-carbid basket, (marked N.)

E is a cut-off cock on pipe between generator Q and gas-receiver M.

X² is a union-coupling connecting generator to gas-receiver.

F is a shut-off cock in pipe leading into gas-receiver.

M is a gas-receiver.

T U represent a pipe conveying gas from receiver to water-reservoir cylinder.

V is a pipe conveying gas from receiver to burners.

K is a blow-off cock or safety-valve on pipe T U.

X³ is a union-coupling connecting water-reservoir L to receiver M.

H is a shut-off cock on pipe T U.

Y is a dial with graduations "1," "2," "3," &c., to coöperate with a pointer on cock H to regulate and indicate the flow of gas on water, so that the latter may be forced into the generator in quantity sufficient to produce gas for one, two, three, or more burners, as the case may be.

J is a stop-cock on the main pipe, and Z is the main pipe to the burners.

The operation of the device is as follows: To charge the apparatus, first open unions X' and X² and remove generator, which is opened by loosening screw S. Then put calcium carbid in the basket until the latter is about two-thirds full. Replace the lid and put the generator in place and connect the unions X' and X² and close stop-cocks C and D and open stop-cock B. Fill cylinder L with water by pouring into A and open stop-cocks C and D till water flows on the calcium carbid. Then open stop-cocks E and F and close stop-cock J. Generate gas till valve K blows off, then open cock H to let gas in on water by moving the pointer of the cock over the dial to the number corresponding to the number of burners to be used. The machine will then continue to feed itself automatically, generating gas just as it is consumed, but no faster.

In houses or stores where there are no outhouses or places to put the apparatus in it is desirable in filling the generator to undo the unions and remove the generator and to carry it out and clean the basket and then to refill and couple up again. When placed in outhouses, the screw S can be loosened and the clamp and generator can be taken out without undoing the unions.

In the apparatus herein shown and described there is embodied a generic organization consisting of a gas-receiver, a water-reservoir, and a gas-generating chamber, the upper portion of the water-reservoir being connected to the gas-issue pipe at a point between the gas-receiver and the mains, and the gas-generator being connected to the bottom part of the water-reservoir and the gas-receiver by separate pipes and valves for controlling the flow in said pipes. This subject-matter having been awarded to another inventor in an interference is hereby disclaimed, and I furthermore limit my claims to the specific construction and arrangement of apparatus shown by me, which furnishes a very simple and practical organization for carrying out the principles of the broader invention. My invention supplies an organization which, while new in its combination of parts, utilizes such elements as may be cheaply and conveniently obtained on the market of any plumbers' supply store.

Having thus described my invention, what I claim as new, and desire to secure by Letters Patent, is—

1. An acetylene-gas machine consisting of a gas-receiver, a water-reservoir, and a subjacent gas-generator, the gas-receiver having a gas-issue pipe at the top connected by a branch to the top of the water-reservoir, and a gas-inlet pipe connecting its bottom with the top of the generator, a water-inlet pipe arranged at the top of the water-reservoir and connected with the branch gas-pipe leading from the gas-receiver, a regulating-valve in said branch pipe, and a pipe leading from the bottom of the water-reservoir to the top of the gas-generator, and means for controlling the flow substantially as described.

2. An acetylene-gas apparatus comprising a gas-receiver M, and water-reservoir L, arranged side by side, a vertical water-filling pipe with stop-cock entering the top of the water-reservoir, a vertical outflow-pipe for gas from the receiver, a branch pipe having blow-off valve and regulating-valve connecting the upper end of the gas-receiver with the upper end of the water-reservoir, a subjacent generator-chamber with carbid-holder and detachable lid, and independent pipes and stop-cocks connecting the generator with the gas-receiver and water-reservoir respectively substantially as described.

In testimony whereof I have signed my name to this specification in the presence of two suscribing witnesses.

THEODORE GEORGE AMES.

Witnesses:
L. H. SCHOLLENBERGER,
W. P. METCALF.